(12) United States Patent
Wada et al.

(10) Patent No.: US 8,665,480 B2
(45) Date of Patent: Mar. 4, 2014

(54) SERVER DEVICE, SYSTEM, AND ORDER ACCEPTING METHOD

(75) Inventors: Toshiaki Wada, Tama (JP); Kyosuke Ono, Tama (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 13/593,613

(22) Filed: Aug. 24, 2012

(65) Prior Publication Data

US 2013/0050754 A1 Feb. 28, 2013

(30) Foreign Application Priority Data

Aug. 29, 2011 (JP) ................................ 2011-185867

(51) Int. Cl.
*G06K 15/00* (2006.01)
*G06F 3/12* (2006.01)
*H04N 1/46* (2006.01)

(52) U.S. Cl.
USPC ......... 358/1.15; 358/1.14; 358/1.16; 358/539

(58) Field of Classification Search
USPC ........ 358/1.6, 1.9, 2.1, 2.99, 3.01, 3.24, 1.16, 358/1.15, 501, 539, 540, 403, 448, 476, 358/508, 1.14; 709/201, 212, 213, 220, 709/223, 227, 230, 238, 245, 246, 249, 250, 709/200; 710/1, 3, 10, 12, 20, 26, 33, 60, 710/64, 72, 74, 100, 104, 105, 200, 268
See application file for complete search history.

(56) References Cited

U.S. PATENT DOCUMENTS

| | | | |
|---|---|---|---|
| 6,788,384 B2 * | 9/2004 | Iida | ................................ 355/40 |
| 6,900,882 B2 | 5/2005 | Iida | |
| 6,970,229 B2 | 11/2005 | Iida | |
| 7,126,665 B2 | 10/2006 | Iida | |
| 7,164,778 B1 | 1/2007 | Nakamura et al. | |
| 7,199,865 B2 | 4/2007 | Iida | |
| 7,565,035 B2 * | 7/2009 | Wada | ............................ 382/305 |

(Continued)

FOREIGN PATENT DOCUMENTS

| | | |
|---|---|---|
| JP | 2003-196042 | 7/2003 |
| JP | 2003-219148 | 7/2003 |
| JP | 2005-107956 | 4/2005 |
| JP | 2006-041622 | 2/2006 |

OTHER PUBLICATIONS

Jun, Terminal Unit Printing System Server Program and Output Medium, Nov. 7, 2003, Machine Translating Japanese Patent Publication, JP2003196042, All pages.*

*Primary Examiner* — Ngon Nguyen
(74) *Attorney, Agent, or Firm* — John C. Pokotylo; Straub & Pokotylo

(57) ABSTRACT

A server device includes a print history database; an information adding unit for adding, as invisible information, first information for specifying image data and second information about a server address; a first print data transmitting unit for transmitting, to a print server, the image data to which the invisible information is added; an image storage unit for storing image data which corresponds to the first information; a list generating unit for generating a list of the print product based on a print history of the image data specified by the first information read from the invisible information by a terminal device; a selected information receiving unit for receiving product specifying information that specifies the print product selected from the list of the terminal device; and a second print data transmitting unit for transmitting the print data on the print product specified by the product specifying information.

10 Claims, 8 Drawing Sheets

(56) References Cited

U.S. PATENT DOCUMENTS

| | | |
|---|---|---|
| 7,792,323 B2 | 9/2010 | Nakamura et al. |
| 7,817,818 B2 | 10/2010 | Nakamura et al. |
| 7,860,270 B2 | 12/2010 | Nakamura et al. |
| 7,978,877 B2 | 7/2011 | Nakamura et al. |
| 2002/0030842 A1 | 3/2002 | Iida |
| 2008/0151280 A1* | 6/2008 | Kamijo et al. ................ 358/1.9 |

* cited by examiner

FIG. 6

PRINT HISTORY DB

| ORDER ID | ABC000001 |
|---|---|
| ORDERER | PA1234567 |
| NUMBER OF ADDRESSEES | 1 |
| ADDRESSEE | PA1234567 |
| DESTINATION ADDRESS | SETAGAYA, TOKYO |
| ORDER DATE | FEB. 28, 2011 |
| TYPE OF PRODUCT | ALBUM |
| ATTRIBUTE OF PRODUCT | FAMILY |
| NUMBER OF IMAGES | 20 |
| QUANTITY OF PRODUCTS | 1 |
| IMAGE ID | IM00000001 |
| | ⋮ |
| | IM00000020 |
| ORDER ID | ABC000002 |
| ORDERER | PA4567890 |
| NUMBER OF ADDRESSEES | 10 |
| ADDRESSEE | PA9876001 |
| DESTINATION ADDRESS | MATSUMOTO, NAGANO |
| ⋮ | ⋮ |
| ADDRESSEE | PA9876010 |
| DESTINATION ADDRESS | MITAKA, TOKYO |
| ORDER DATE | DEC. 5, 2010 |
| TYPE OF PRODUCT | CARD |
| ATTRIBUTE OF PRODUCT | Xmas |
| NUMBER OF IMAGES | 1 |
| QUANTITY OF PRODUCTS | 10 |
| IMAGE ID | IM00000100 |
| ORDER ID | ABC000003 |
| ORDERER | PA8901234 |
| NUMBER OF ADDRESSEES | 1 |
| ADDRESSEE | PA3456789 |
| DESTINATION ADDRESS | SAPPORO, HOKKAIDO |
| ORDER DATE | FEB. 28, 2011 |
| TYPE OF PRODUCT | PHOTOGRAPH |
| ATTRIBUTE OF PRODUCT | L SIZE |
| NUMBER OF IMAGES | 10 |
| QUANTITY OF PRODUCTS | 1 |
| IMAGE ID | IM00000301 |
| | ⋮ |
| | IM00000310 |
| ATTRIBUTE OF PRODUCT | 2L SIZE |
| NUMBER OF IMAGES | 5 |
| QUANTITY OF PRODUCTS | 1 |
| IMAGE ID | IM00000321 |
| | ⋮ |
| | IM00000325 |

FIG. 7

PERSON INFORMATION DB

| PERSON ID | PA1234567 |
|---|---|
| NAME | TARO YAMADA |
| MEMBER/NON-MEMBER | MEMBER |
| MEMBERSHIP NUMBER | MEM000100 |
| SEXUALITY | MAN |
| BIRTHDAY | MAR. 24, 1980 |
| REGISTERED ADDRESS | SETAGAYA, TOKYO |
| DESTINATION ADDRESS | SETAGAYA, TOKYO |
| CHARGING ACCOUNT NUMBER | 1234-4567-9012-3456 |
| INTEREST | |
| FAMILY | |
| ACQUAINTANCE | |
| PERSON ID | PA4567890 |
| NAME | HANAKO SUZUKI |
| MEMBER/NON-MEMBER | NON-MEMBER |
| MEMBERSHIP NUMBER | |
| SEXUALITY | |
| BIRTHDAY | |
| REGISTERED ADDRESS | |
| DESTINATION ADDRESS | YOKOHAMA, KANAGAWA |
| CHARGING ACCOUNT NUMBER | 4567-9012-3456-7890 |
| INTEREST | |
| FAMILY | |
| ACQUAINTANCE | PA9876001 : PA9876010 |
| PERSON ID | PA9876001 |
| NAME | HARUKO SATO |
| MEMBER/NON-MEMBER | NON-MEMBER |
| MEMBERSHIP NUMBER | |
| SEXUALITY | |
| BIRTHDAY | |
| REGISTERED ADDRESS | |
| DESTINATION ADDRESS | MATSUMOTO, NAGANO |
| INTEREST | |
| FAMILY | |
| ACQUAINTANCE | PA4567890 : PA9876010 |

EVENT TABLE

| FROM JANUARY 5 TO FEBRUARY 3 | WINTER GREETING CARD |
|---|---|
| FROM FEBRUARY 20 TO MARCH 31 | GRADUATION |
| FROM MARCH 1 TO APRIL 7 | ENTRANCE INTO SCHOOL |
| FROM JULY 10 TO AUGUST 6 | SUMMER GREETING CARD |
| FROM AUGUST 7 TO AUGUST 31 | LATE-SUMMER GREETING CARD |
| FROM DECEMBER 1 TO DECEMBER 24 | Xmas CARD |
| FROM DECEMBER 1 TO DECEMBER 31 | NEW YEAR'S CARD |
| FROM (BIRTHDAY − 30 DAYS) TO (BIRTHDAY − 1 DAY) | BIRTHDAY CARD |

| ORDER DATE | PRODUCT | IMAGE(THUMBNAIL) |
|---|---|---|
| FEB. 28, 2011 | ALBUM | ☐ ☐ ☐ ☐ ☐ |
| DEC. 5, 2010 | CARD | ☐ |
| FEB. 28, 2011 | PHOTOGRAPH | ☐ |
| ⋮ | ⋮ | ⋮ |

SERVER DEVICE, SYSTEM, AND ORDER ACCEPTING METHOD

FIELD OF THE INVENTION

The present invention relates to a server device and a system utilized in an order for print.

BACKGROUND OF THE INVENTION

An online printing service which accepts photoprinting or album making is widely carried out through a network such as Internet. In some cases, a user of the online printing service gives an order for reprinting (extra printing) a photograph printed in the past. In these cases, a user (an orderer) is to find out an original image file to be a source of the printed photograph from a host device or a server, thereby giving a print order newly to a provider of a printing service. Alternatively, the user (the orderer) is to find out an order number for the past print order, thereby informing the provider of the printing service of the order number to newly give a print order. In general, when a period until a new print order for reprinting a photograph is prolonged, it is hard to find out an image file or an order number.

JP2003-196042A discloses that visual information (a one-dimensional code (bar code) or a two-dimensional code) added as management information to a surface of a photograph is read and transmitted to a print server in order to reprint a photograph with its print discolored.

SUMMARY OF THE INVENTION

A server device according to one aspect of this invention accepts a print order through a network. The server device comprises: a communicating unit for communicating with a terminal device through the network; a print history database for storing a print history indicative of a content of the print order; an information adding unit for adding, to image data to be a print target, first information for specifying the image data and second information about an address of the server device as invisible information which can be read by the terminal device; a first print data transmitting unit for transmitting print data including the image data to which the invisible information is added, to a print server for generating a print product from the print data; an image storage unit for storing the image data which corresponds to the first information; a receiving unit for receiving the first information which the terminal device reading the invisible information from the print product transmits based on the second information; a list generating unit for generating a list of the print product using the image data specified by the first information, based on a past print history of the image data specified by the first information which is received; a list transmitting unit for transmitting the list of the print product through the communicating unit to the terminal device; a selected information receiving unit for receiving product specifying information that specifies the print product selected from the list of the print product by the terminal device, through the communicating unit from the terminal device; and a second print data transmitting unit for generating print data on the print product specified by the product specifying information, based on the image data to which the invisible information is added, thereby transmitting the print data to the print server.

A system according to another aspect of this invention has a terminal device and a server device which communicate with each other through a network. The server device comprises: a first communicating unit for communicating with the terminal device through the network; a print history database for storing a print history indicative of a content of a print order; an information adding unit for adding, to image data to be a print target, first information for specifying the image data and second information about an address of the server device as invisible information which can be read by the terminal device; a first print data transmitting unit for transmitting print data including the image data to which the invisible information is added, to a print server for generating a print product from the print data; an image storage unit for storing the image data which corresponds to the first information; a receiving unit for receiving the first information which the terminal device reading the invisible information from the print product transmits based on the second information; a list generating unit for generating a list of the print product using the image data specified by the first information, based on a past print history of the image data specified by the first information which is received; a list transmitting unit for transmitting the list of the print product through the first communicating unit to the terminal device; a selected information receiving unit for receiving product specifying information that specifies the print product selected from the list of the print product by the terminal device, through the first communicating unit from the terminal device; and a second print data transmitting unit for generating print data on the print product specified by the product specifying information, based on the image data to which the invisible information is added, thereby transmitting the print data to the print server. The terminal device comprises: a photographing unit for photographing a subject; a second communicating unit for communicating with the server device through the network; a decoding unit for decoding invisible information of the first information for specifying the image data on the print product and the second information about the address of the server device, the invisible information being embedded in the print product photographed by the photographing unit; an information transmitting unit for transmitting the first information obtained by decoding the invisible information to the address of the server device designated by the second information obtained by decoding the invisible information, through the second communicating unit; a list receiving unit for receiving the list of the print product transmitted from the server device through the second communicating unit; a product selecting unit for selecting the print product from the list of the print product; and a product specifying information transmitting unit for transmitting the product specifying information to the server device through the second communicating unit.

BRIEF DESCRIPTION OF THE DRAWINGS

FIG. 6 is a diagram showing an example of a print history database.

FIG. 7 is a diagram showing an example of a person information database.

DESCRIPTION OF THE PREFERRED EMBODIMENTS

Figure 1:
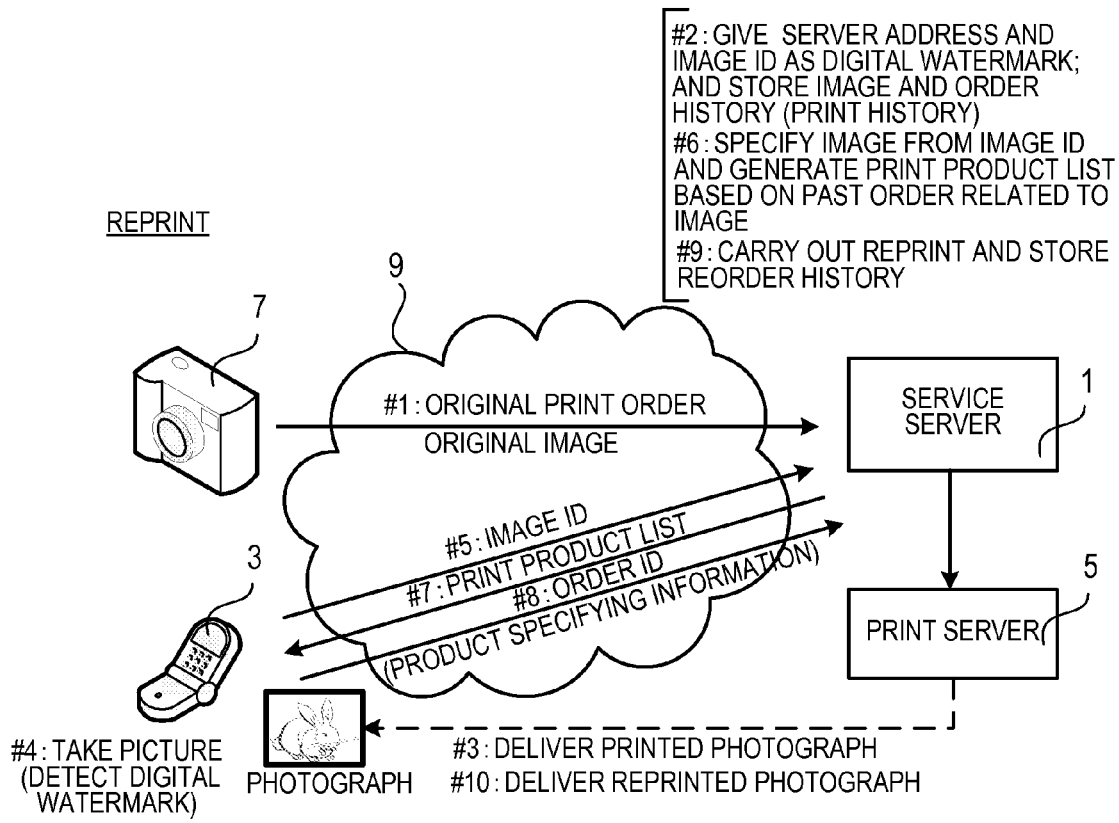
FIG. 1 is a view for explaining an operation related to a reprint of a printing service system.

The summary of an operation related to reprint (extra print) of a printing service system according to an example of an embodiment will be described with reference to FIG. 1. The printing service system includes a service server (which is also referred to as a server device) 1, a terminal device 3 and a print server (or a printer) 5. The service server 1 and the terminal device 3 are connected to communicate with each other through a network 9 including Internet. The service server 1 and the print server 5 are connected to communicate with each other through a network (or the network 9), a USB (Universal Serial Bus) or the like.

In an initial print order to be given by an orderer (that is, a print order of an original image (original print order)), an electronic camera 7 photographs a subject, thereby generating original image data (an original image) to be a basis of a photograph to be printed, to transmit an image file and order data to the service server 1 via the network 9 (a processing #1 of FIG. 1). For example, the image file is based on the Exif (Exchangeable image file format) standard and is constituted by a head portion and image data (which is also referred to as an image) in a predetermined format (for example, the JPEG format). A single image file may be transmitted when an order for photograph print or creation of a greeting card is given, and a plurality of image files may be transmitted when an order for a product such as an album or a photo book is given. The original image is stored as an image file in a storage medium provided in or attached to the electronic camera 7, and a user may select at least one of the image files when giving an order, thereby transmitting the image file and the order data to the service server 1 via the network 9.

When a request for a membership registration (a user registration) is given from the service server 1 communicating with the electronic camera 7, moreover, an orderer can transmit personal information, thereby carrying out the membership registration. The service server 1 can transmit a registration form to the orderer so that the orderer can input the personal information about the orderer to the registration form displayed on a display unit (a monitor) by using an operating unit of the electronic camera 7. The service server 1 registers membership information in a person information database (DB) 18 which will be descried below, based on the personal information filled in the registration form. The membership registration is previously carried out for the service server 1 through the network 9 such as a personal computer in some cases.

The order data may include information for identifying an orderer (a name, an ID number (an identification number), an orderer's address and the like), information related to an addressee (a name, an ID number (an identification number), a destination address and the like), the number of printed sheets for each addressee and information about a print product to be ordered (a product type, a quantity and the like). The ID number is not transmitted by the orderer but is preferably given by the service server 1.

The electronic camera 7 has a communicating function and functions as an image transmitting device. The electronic camera 7 is connected to the network 9 including Internet via an access point through wireless LAN or Wi-Fi, for example. The electronic camera 7 having the communicating function may be a portable telephone having an electronic camera function and is connected to the network 9 including the Internet via a portable telephone network in this case.

If the electronic camera 7 has no communicating function, another image transmitting device having the communicating function (an internet connectable computer or the like) may fetch an original image file, thereby transmitting the image file and the order data to the service server 1 to give an order for printing.

The service server 1 embeds, in the image data, information (for example, a character string) including an address of the service server 1 and an image ID (or a control number) for specifying an image as a digital watermark to be invisible information and stores the information in an image storage device 13 (an image storage unit) which will be described below (a processing #2 in FIG. 1). An address is information for designating a communicating partner over a network including an IP address, a URL (Uniform Resource Locator), information which can be converted into an IP address (a telephone number etc.) and the like. Moreover, the service server 1 transmits, to the print server 5, the image data in which the digital watermark is embedded and a print request including print order information and destination information about a print product. The print order information includes a type (a product type) and a quantity of the print product, and furthermore, a print size in the case where the print product is a photograph, template information about an album, information about a page or an arrangement for printing an image in the case where the print product is the album.

The print server 5 to be the printer has a communicating function and a printing function, and prints image data as a photograph or an album on a paper or the like in accordance with print order information in the print request when receiving the print request from the service server 1 (a processing #3 in FIG. 1). The digital watermark which cannot be recognized visually is embedded in an image in the printed photograph or album. The printed photograph or album may include a mark (visible information) indicating that the digital watermark is added thereto (see FIG. 2). It is desirable to employ a mark having such a color or shape as to be visually recognizable and as not to disturb an appreciation of the printed photograph or album. Alternatively, the mark may be a character. It is desirable that the mark should be printed in a position which does not disturb the appreciation (for example, an end of the printed photograph or a peripheral portion thereof). The print product formed by the printed photograph or album is sent to the addressee by means such as mail. The print server 5 gives the service server 1a notice of the shipment of the print product. The service server 1 adds an order ID (identifier) to an print order history (also referred to as an order history) on which the shipment was completed, and registers the print order history in the print history database (DB) 17 which will be described below.

In an order for reprint (that is, a reorder), next, an orderer for reprint uses the terminal device 3 to acquire an image of the printed photograph to be reprinted (a processing #4 in FIG. 1). In the present embodiment, the photograph to be a reprinting target is printed by the print server 5 and the digital watermark is added thereto. The terminal device 3 having the electronic camera function and the communicating function reads the watermark from the image data acquired by taking a picture (image) of the printed photograph and obtains an image ID of the printed photograph and an address. For example, the terminal device 3 is a portable telephone having an electronic camera function or an electronic camera having a communicating function. The terminal device 3 transmits the acquired image ID (control number) to the acquired address (a processing #5 in FIG. 1). The acquired address is an address of the service server 1 for accepting reprint. The terminal device 3 may be identical to the electronic camera 7.

The service server 1 receiving the image ID specifies the image data corresponding to the image ID, and retrieves a print history (an order history) indicative of a past print content or order content related to the image data through the print history database 17. Furthermore, the service server 1 generates a list (or a table) of a print product using the image data, based on the past print history thus retrieved (a processing #6 in FIG. 1), and transmits data on the list of the print product to the terminal device 3 so as to enable a menu display (a processing #7 in FIG. 1). The data on the list of the print product (which is also referred to as menu data) may include an order ID, a product type, an order date and a thumbnail of an image contained in a product, and furthermore, service contents related to a product, for example, an addressee, a destination address and the like. Moreover, the service server 1 may add a new print product to the list by referring to the print history database 17 and the person information database 18. For example, even if only a print order for a photograph is registered as the print history in the print history database, a greeting card which is suitable for a season on a reorder point may be added to the list. If a birthday of an orderer is coming, moreover, it is also possible to add an album including images printed in the past year.

The terminal device 3 causes the display unit (monitor) to carry out the menu display. The orderer for the reprint selects the print product from the menu of the product list on the monitor by using an operating unit 37 which will be described below. The orderer can modify the content of the print order related to the print product by using the operating unit 37 if necessary. The terminal device 3 transmits, to the service server 1, product specifying information (an order ID) for specifying the selected print product (a processing #8 in FIG. 1).

The service server 1 transmits a print request to the print server 5 (a processing #9 in FIG. 1). The print request includes past print order information specified by the order ID (identifier), print order information and destination information which are generated based on information modified by operating the operating unit 37 of the terminal device 3 through an orderer for a reorder, and image data (an image file). The print server 5 prints the image data as a photograph, a greeting card or an album depending on print order information in a reprint request. An image is printed on a normal paper. However, anything on which an image can be printed may be employed in addition to the paper. An image may be printed on a cloth (for example, a T-shirt) or a pottery (for example, a cup). An image ID for specifying an image and an address of the service server 1 are also embedded, as a digital watermark which cannot be recognized visually, in an image in a reprinted photograph or album.

A print product such as a reprinted photograph or album is sent to a destination by means such as mail (a processing #10 in FIG. 1). The service server 1 adds the order ID (identifier) to register the print history (or the order history) related to a reprint product in the print history database (DB). When the reprint orderer modifies the content of the print order to add a new addressee as a destination by using the terminal device 3, the service server 1 registers a name and a destination address of the addressee in the person information database 18.

Figure 3:
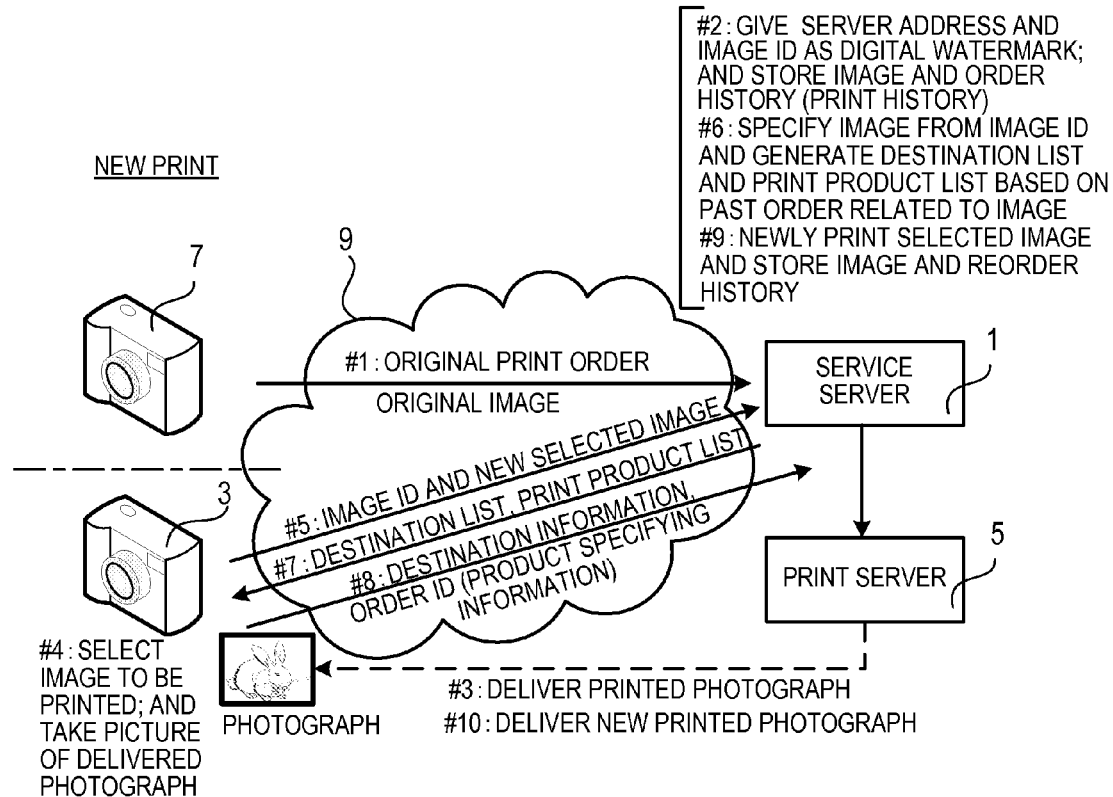
FIG. 3 is a view for explaining an operation related to a new print of the printing service system.

With reference to FIG. 3, description will be given to the summary of an operation related to a new print of a print service system according to an embodiment (excluding an initial print order). In FIG. 3, processings #1 to #3 are carried out in the same manner as in FIG. 1

In a new order, next, an orderer for a new print uses the terminal device 3 to acquire an image of a printed photograph to which a mark indicative of the addition of a digital watermark is attached in a state where an image file to be newly printed is selected by the operating unit 37 (a processing #4 in FIG. 3). The image file to be printed newly is selected through a thumbnail displayed on the monitor of the terminal device 3, or the like. The terminal device 3 having the electronic camera function reads a watermark from image data acquired by taking a picture (image) of a printed photograph and obtains an image ID of the printed photograph and an address of the service server 1. For example, the terminal device 3 is an electronic camera having a communicating function or a portable telephone having an electronic camera function. The terminal device 3 transmits the acquired image ID together with an image file to be printed newly (a new image file) to the service server 1 (a processing #5 in FIG. 3). For example, the image file is based on the Exif standard. If a plurality of image files is to be printed newly for an album or the like, the terminal device 3 may transmit a plurality of image files.

The service server 1 receiving the image ID and the new image file specifies image data corresponding to the received image ID of the printed photograph and retrieves a past print history related to the image data. Furthermore, the service server 1 generates a list (or a table) of a destination of a print product using the image data corresponding to the image ID, based on the past print history thus retrieved (a processing #6 in FIG. 3). The service server 1 transmits data on list of the destination and data on a list of a product configuration (that is, a list of the print product) as menu data to the terminal device 3 (a processing #7 in FIG. 3). The product configuration represents a type of a print product (a product type) such as an L-form photograph, a summer greeting card or an album having 10 pages.

The terminal device 3 causes the monitor to display, as a menu, the list of the product configuration and the list of the destination. The print orderer uses the operating unit 37 to select the product configuration from the menu of the list of the product configuration on the monitor and to select the destination from the menu of the destination list, and furthermore, inputs a quantity of a product. If the menu of the destination list has no desirable destination, the destination is input. The terminal device 3 transmits, to the service server 1, information for designating the selected product configuration and the destination information (a processing #8 in FIG. 3).

The service server 1 generates print order information based on the information for designating the product configuration transmitted from the terminal device 3 and quantity information about the designated print product, and furthermore, generates an image ID for specifying the image data included in the new image file transmitted from the terminal device 3. Moreover, the service server 1 synthesizes the generated image ID and the address of the service server 1 as a digital watermark with the image data. A new print request including the generated print order information, the image data having the digital watermark synthesized therewith, and the destination information received from the terminal device 3 is transmitted to the print server 5 (a processing #9 in FIG. 3). The print server 5 prints the image data as a photograph or an album on a paper or the like, depending on the print order information included in the new print request. The digital watermark, in which the image ID and the address of the service server 1 cannot be recognized visually, is embedded in an image in the printed photograph or album. A reprint product including a newly printed photograph (a print photograph) is sent to a destination by means such as mail (a processing #10 in FIG. 3). The service server 1 adds the order ID to register a print history (or an order history) related to the new print product in the print history database 17.

Figure 4:
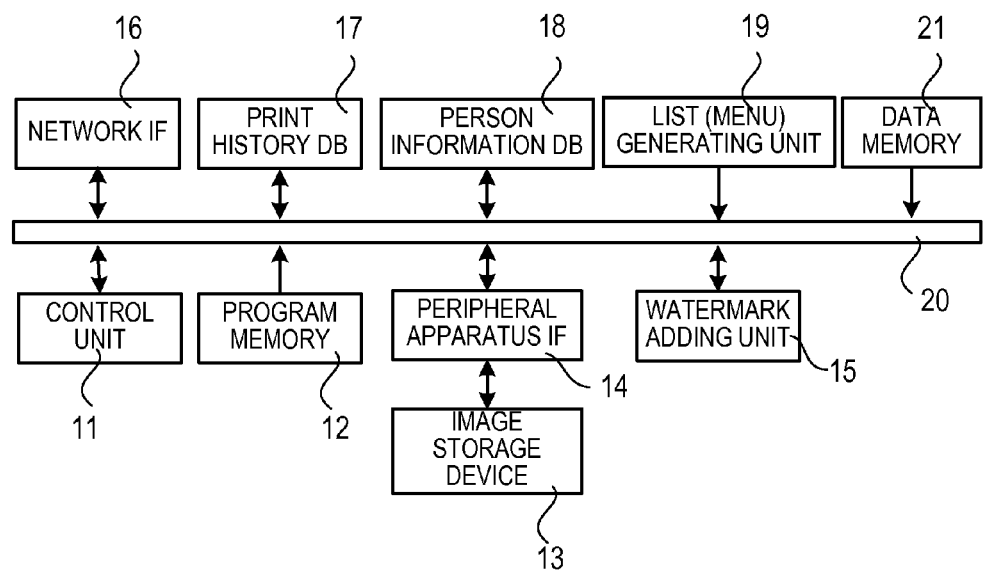
FIG. 4 is a diagram showing a structure of a service server.
Figures 8, 9:
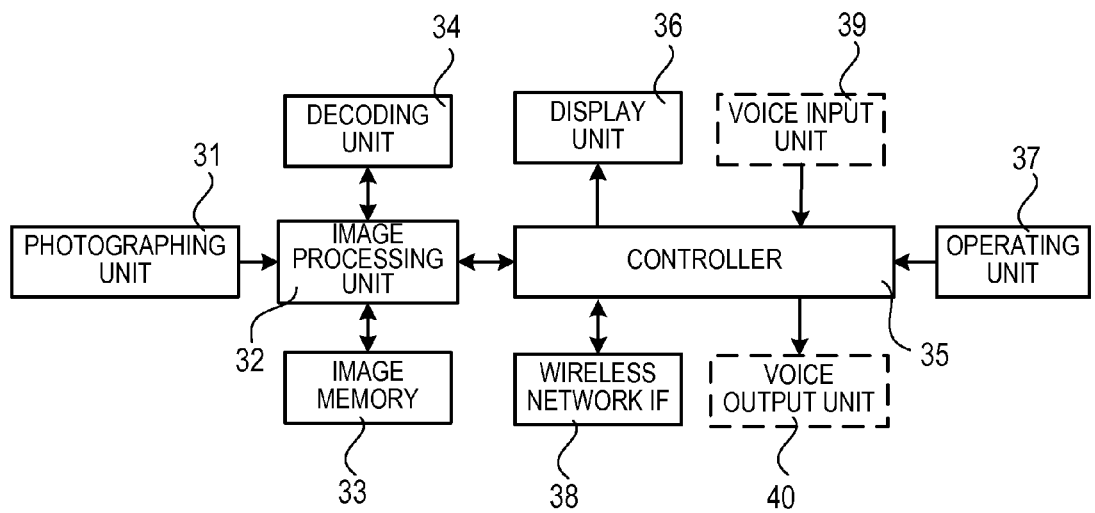
FIG. 8 is a diagram showing an example of an event table.
FIG. 9 is a diagram showing a structure of a terminal device.

FIG. 4 is a diagram showing a structure of the service server 1. The service server 1 includes a control unit 11, a program memory 12, an image storage device 13, a peripheral apparatus interface (IF) 14, a watermark adding unit (an information adding unit) 15, a network interface (IF) 16, the print history database (DB) 17, the person information database (DB) 18, a menu generating unit 19 and a bus 20. Moreover, the service server 1 includes a data memory 21 for storing a membership registration form, a format of a greeting card or the like and an event table (FIG. 8). Furthermore, the service server 1 may include a memory for offering a work area to be used by the control unit 11, the watermark adding unit 15 and the menu generating unit 19. The control unit 11, the watermark adding unit 15, a menu generating unit 19 (or a whole of them) may be constituted by an arithmetic processing circuit such as an FPGA (Field-Programmable Gate Array), an ASIC (Application Specific Integrated Circuit) or the like respectively or may be constituted by a microcomputer having a CPU (a central processing unit) and a memory.

The control unit 11 controls an operation of respective units 12 to 21 of the service server 1. A bus 20 electrically connects the respective units 11 to 21. The program memory 12 is an ROM (Read Only Memory) for storing a program to be executed by the control unit 11 or the like. The image storage device 13 is a storage device such as a hard disk for storing a plurality of image data (or image files) as an image database therein. The peripheral apparatus interface (IF) 14 is an interface for a connection to a peripheral apparatus, particularly, the image storage device 13. The network interface 16 is a communicating unit for a connection to the network 9 and transmits/receives information to/from the terminal device 3 connected to the network 9.

Figure 5:
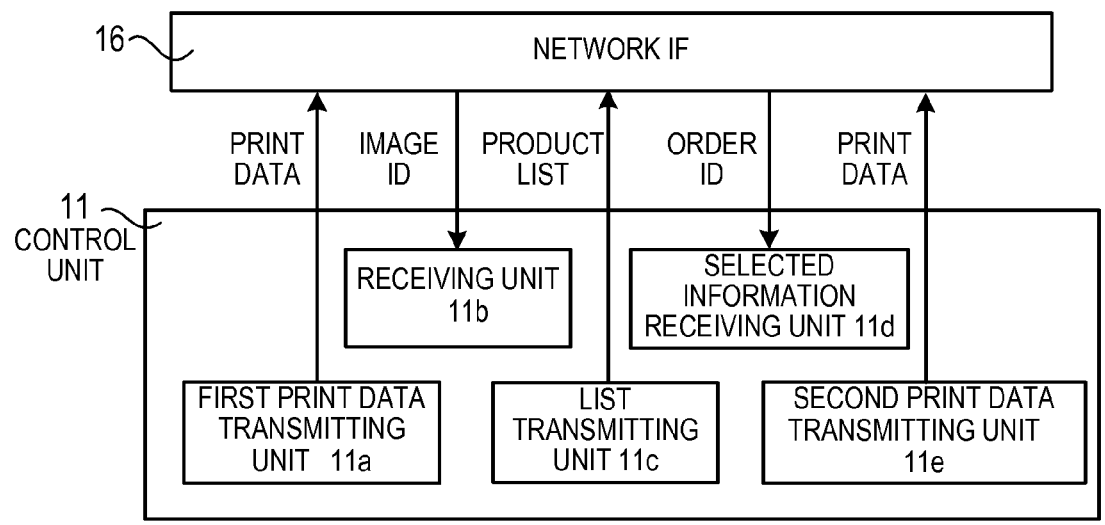
FIG. 5 is a functional block diagram showing a control unit of the service server.

FIG. 5 is a functional block diagram showing the control unit 11. A first print data transmitting unit 11a transmits print data including the image data (image file) of the image storage device 13 and the type or quantity of the print product (print order information) and print request data including the destination information to the print server 5 through the network interface 16. The receiving unit 11b receives the image ID read and transmitted from the printed photograph by the terminal device 3 and transmits the image ID to the menu generating unit 19. The list transmitting unit 11c transmits the list of the print product generated by the menu generating unit 19 to the terminal device 3 through the network interface 16. The selected information receiving unit 11d receives the product specifying information (order ID) for specifying the print product selected from the list of the print product by the terminal device 3. Moreover, the designation information selected from the destination list of the product is received by the terminal device 3. A second print data transmitting unit 11e generates print data corresponding to the product specified based on the product specifying information received by the selected information receiving unit 11d and acquires the destination information corresponding to the product specifying information (order ID) by referring to the print history database 17. Then, the second print data transmitting unit 11e transmits, to the print server 5, a print request including the print data containing the image data and the destination information.

The menu generating unit 19 may generate a destination list in addition to the print product list, the list transmitting unit 11c may transmit the generated product list and the destination list to the terminal device 3, and the selected information receiving unit 11d may receive the product specifying information selected from the product list and the destination specifying information selected from the destination list by the terminal device 3. In this case, the selected information receiving unit 11d transmits, to the print server 5, information about the destination specified by the received destination specifying information together with the print data from the second print data transmitting unit 11e.

The watermark adding unit 15 adds information about a character string including the image ID of the image data (information for specifying an image) and the address of the service server 1 as a digital watermark to the image data in the image file. The character string includes the address and the image ID in accordance with a defined format, for example, "IP: 219. 199. 68. 72, ID: ABC12345678". The watermark adding unit 15 synthesizes the image ID and the address of the service server 1 as the digital watermark with the image data, thereby causing the image ID to correspond to the image data. The image storage device 13 stores the image data which are caused to correspond to the image ID. "IP: 219. 199. 68. 72" represents that an IP address of the service server 1 for accepting the reorder or additional order is "219. 199. 68. 72" and "ID: ABC12345678" represents that the image ID is "ABC12345678".

By using the spread spectrum modulation technique (for example, see JP2003-219148A), the digital watermark is encoded in a predetermined format and embedded in an image such that the digital watermark is not perceived when a photograph of the image is printed, and thus the digital watermark does not disturb the appreciation of the printed photograph. The watermark adding unit 15 spreads (modulates) character information (an address and an image ID) to be embedded, by using a sufficiently large random number sequence, and adds the resultant spread series to an image depending on an embedding strength. If the digital watermark is embedded in the DCT coefficient matrix image generated by the frequency conversion of an image, the watermark adding unit 15 frequency-converts the spread series to obtain a DCT coefficient matrix and adds the DCT coefficient matrix to coefficient values of the DCT coefficient matrix image, and thus embeds the spread series of the character information in the DCT coefficient matrix image.

As a method of adding information to a photograph, there may be used any method of preventing a disturbance of the appreciation of a printed photograph in addition to the digital watermark. There is known a fluorescent ink to be visible through an irradiation of a light having a special wavelength (for example, ultraviolet rays or infrared rays). The added information may be printed as an invisible watermark on an image by using the fluorescent ink.

Figure 2:
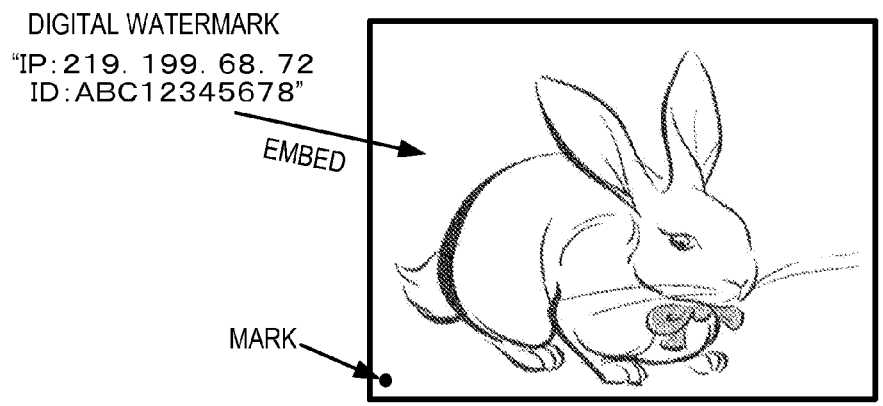
FIG. 2 is a view illustrating a photograph (a print product) in which a digital watermark is embedded.

Furthermore, the watermark adding unit 15 synthesizes graphic data (graphic information) on a mark with the image data, in order to add, onto a print product, the mark indicative of an addition of a digital watermark. The mark is added so as to be visually recognizable and not to be remarkable on the print product, as shown in FIG. 2. In other words, a part of the image data is replaced with the graphic data on the visible mark.

The print history database 17 (or the order history database) and the person information database (DB) 18 are stored in a storage device such as a hard disk. FIG. 6 shows an example of the print history database 17. The print history database 17 stores a print order history. The order history includes an order ID (an identifier for specifying an order), an orderer (an ID number for specifying an orderer), the number of addressees, an addressee (an ID number for specifying an addressee), a destination address, an order date, a type of a product (an article), an attribute of a product, the number of images included in a product (the number of photographs), a quantity of products, and an image ID (an ID for identifying an image) of image data (or an image) to be used in a product.

FIG. 7 shows an example of the person information database 18. Person information includes a person ID (an order ID and an addressee ID), a name (an orderer name and an addressee name), information about a member/a non-member, a membership number, a sexuality, a birthday, a registered address, a destination address, a charging account number (or a credit card number) and the like. The information about the member in the person information can be registered in the person information database (DB) 18 through the membership registration. The information about the non-member (both the orderer and the addressee) can be registered in the person information database (DB) 18 based on the print history (order history). The registered address is a contact address of the member and the destination address is a destination address for a product.

The image database (not shown) of the image storage device 13 stores image data and an image ID for specifying the image data in relation to each other, and the image ID is designated so that the image data can be accessed.

The menu generating unit 19 generates, on the basis of the retrieved past print history, a product list and a destination list (which are menu data) of print products using image data corresponding to the image ID. The image ID is read from the digital watermark and transmitted by the terminal device 3. Moreover, the menu generating unit 19 may add a new print product to the product list based on an event table (FIG. 8) by referring to the print history database (DB) 17 and the person information database (DB) 18.

FIG. 8 shows an example of the event table. The event table is correspondence information for causing a period to correspond to a type of a greeting card to be the print product. The menu generating unit 19 can select, on the basis of the event table, a type of a greeting card (a New Year's card or the like) corresponding to a period including an order date, thereby adding the type as a new print product to the list. The menu generating unit 19 can acquire information about a birthday of an orderer from the person ID of the orderer (in the case of the member) of the person information database 18 and can calculate an age of the orderer at the order date, thereby adding a new print product to the list depending on the age of the orderer. For example, if the orderer is young, the type of the greeting card may be selected except for a part of the event table in FIG. 8 (e.g. except for a winter greeting card, a summer greeting card, a late-summer greeting card or the like) to add a new print product. The menu generating unit 19 can acquire information about a birthday of the addressee from the person ID of the addressee of the person information database 18 (in the case of the member), thereby adding a birthday card as a new print product depending on the birthday of the addressee.

FIG. 9 is a diagram showing a structure of the terminal device 3. The terminal device 3 includes a photographing unit 31, an image processing unit 32, an image memory 33, a decoding unit (decoder) 34, a controller 35, a display unit (monitor) 36, the operating unit 37, a wireless network interface 38, a voice input unit 39 and a voice output unit 40. Furthermore, the terminal device 3 may include a memory for offering a work area to be used by the decoding unit 34, the controller 35 or the like. The voice input unit 39 and the voice output unit 40 are provided in the case where the terminal device 3 is a portable telephone, and can be omitted in the case in which the terminal device 3 is an electronic camera. The image processing unit 32 and the decoding unit 34 may be constituted by an arithmetic processing circuit such as an FPGA or an ASIC respectively or may be constituted by a microcomputer including a CPU and a memory.

The photographing unit 31 includes a taking lens for forming an image of a light fetched from an outside, an image pickup element for converting an optical image thus formed into an image signal, and an image pickup element IF circuit for AD converting an output of the image pickup element. The image processing unit 32 carries out a processing such as a γ correction, a color conversion or demosaicing over a digital image signal output from the photographing unit 31, thereby outputting image data. The image memory 33 is a flash ROM or a memory card which serves to store, as an image file, the image data output from the image processing unit 32.

The decoding unit 34 carries out a spread spectrum demodulation (an inverse spreading) for the image data to extract character string information which is synthesized with the image data as a watermark (for example, see JP2003-219148A and JP2006-41622A). Here, the image data is acquired by the photographing unit 31 taking an image (picture) of the printed photograph having the watermark and by the image processing unit 32 processing the image signal. In other words, the decoding unit 34 executes a reverse process to the embedding of the digital watermark through the watermark adding unit 15 of the service server 1, decodes the digital watermark and acquires an address and an image ID from a character string of the defined format which is obtained by the decoding.

In the case where the terminal device 3 extracts information on the address and the image ID printed with a fluorescent ink, it is preferable that the terminal device 3 should irradiate infrared rays or ultraviolet rays to photograph the printed image. Consequently, it is possible to detect the character string indicative of the address and the image ID from the photographed image. In order to implement the method, it is preferable to incorporate an infrared LED (a light emitting diode) or an ultraviolet LED (a light emitting diode) into the terminal device 3.

The controller 35 controls each of the image processing unit 32, the display unit 36 and the like, and inputs an operating signal from the operating unit 37 and is connected to the network 9 through the wireless network interface 38. The controller 35 may include a CPU (central processing unit) and a plurality of electric circuit blocks. The controller 35 includes, as the electric circuit block, a compression/expansion circuit for compressing image data from the image processing unit 32 and transmitting the compressed image data to the image memory 33, and expanding the image data transferred from the image memory 33. In the case where the terminal device 3 is a portable telephone, the controller 35 includes, as the electric circuit block, an audio codec circuit for encoding and decoding a voice signal.

Figures 10, 11:
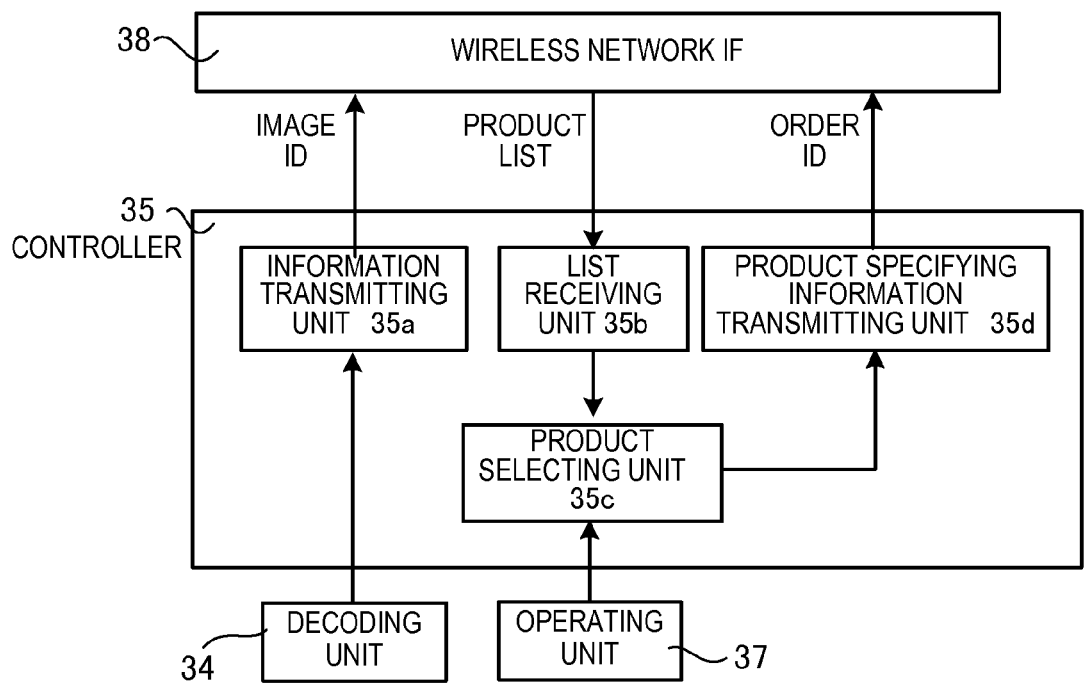
FIG. 10 is a diagram showing an example of a menu to be displayed on a display unit of the terminal device.
FIG. 11 is a functional block diagram showing a controller of the terminal device.

The display unit 36 is a liquid crystal monitor, for example, and is driven by the controller 35 to display a menu or the like. The controller 35 displays, on the display unit 36, a part or whole of the menu data on the product list generated by the menu generating unit 19 of the service server 1. FIG. 10 is a diagram showing an example of the menu to be displayed on the display unit 36. The menu to be displayed includes items such as a type of a product, an order date that the product is ordered, and a thumbnail of an image used in the product. It is also possible to display a destination list menu together with the product list menu.

The operating unit 37 includes a release switch for the photographing unit 31 or a button for selecting and determining a menu. The controller 35 transmits the product specifying information (order ID) corresponding to the product selected over the menu by the operating unit 37 to the service server 1 through the wireless network interface 38. The controller 35 may display, on the display unit 36, a service content such as an addressee corresponding to the selected product or a destination address, an order ID and the like, and may transmit the product specifying information (order ID) to the service server 1 when a transmission permitting signal is input from the operating unit 37. In this case, the orderer may utilize the operating unit 37 to modify the service content such as the addressee or the destination address, and the controller 35 may transmit information about the modified service content to the service server 1.

The wireless network interface 38 includes an antenna unit for transmitting/receiving a radio wave. The voice input unit 39 is present in the case where the terminal device 3 is a portable telephone, and is constituted by a microphone for inputting a voice and an amplifier. The voice output unit 40 is present in the case where the terminal deice 3 is a portable telephone, and is constituted by a speaker for outputting a voice and an amplifier.

FIG. 11 is a functional block diagram showing the controller 35. An information transmitting unit 35a of the controller 35 transmits an image ID to an address of the service server 1 if information obtained by decoding a digital watermark includes information about an image ID for specifying an image and the address. A list receiving unit 35b receives a list of a print product transmitted from the service server 1. A product selecting unit 35c selects the print product from the list of the print product depending on the operation of the orderer. A product specifying information transmitting unit 35d transmits an order ID as the product specifying information to the service server 1. The list receiving unit 35b may receive the list of the destination in addition to the list of the print product. In this case, the product selecting unit 35c selects the destination from the list of the destination in addition to the selection of the print product depending on the operation of the orderer from the list of the print product, and the product specifying information transmitting unit 35d transmits, to the service server 1, the order ID and the destination specifying information which are selected by the product selecting unit 35c.

Figure 12:
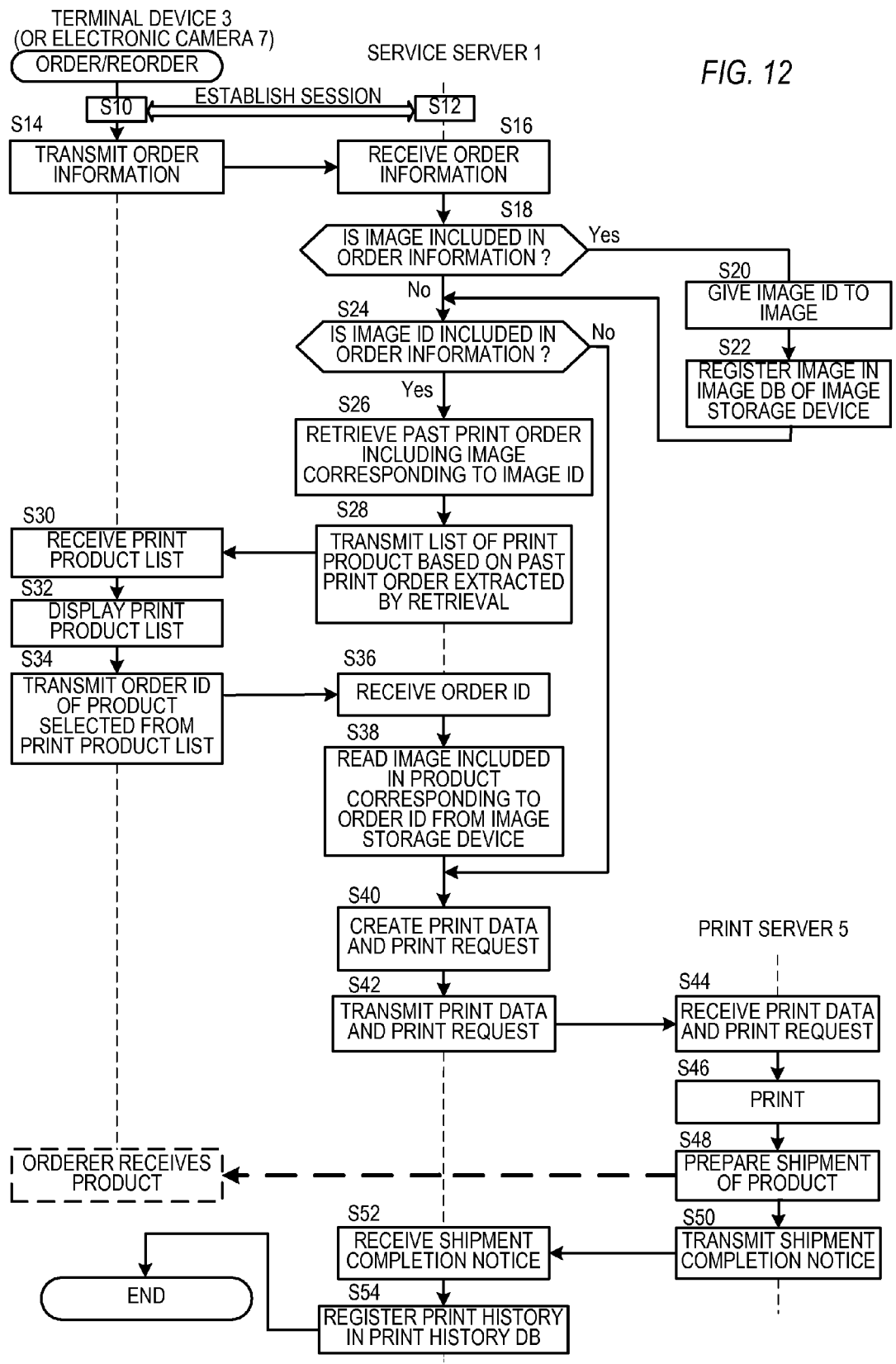
FIG. 12 is a flow chart for explaining an operation of the printing service system in detail.

FIG. 12 is a flow chart for explaining, in detail, an operation of a processing for ordering (or reordering) a print service system.

When the terminal device 3 is operated to start a processing for ordering a print service, the terminal device 3 transmits a connection request to the service server 1 so that a processing for establishing a session is started at Step S10. At Step S12, the service server 1 receives the connection request from the terminal device 3 and executes a processing for authenticating the terminal device 3 to establish a session between the terminal device 3 and the service server 1.

At Step S14, the terminal device 3 transmits order information which can include an image ID, to the service server 1. In the case of an initial print order or the case of an additional print order, the order information includes an image file for image data obtained by photographing through the terminal device 3. On the other hand, in the case of a print reorder, the order information does not include the image file. The initial print order represents that an image is initially transmitted to the service server 1 to give an order for a print product of the image. The print reorder represents that an order for a print product is given again for the same image as that in a past order for a print product of an image, and a type of the print product may be different from the past print product. Moreover, the additional print order represents that a print product for a new image is ordered and transmitted to the same destination as that in the past order for the print product.

At Step S16, subsequently, the service server 1 receives, through the network IF 16, the order information transmitted from the terminal device 3.

At Step S18, the control unit 11 of the service server 1 decides whether an image file is included in the order information received through the network IF 16 or not. If the image file is included, the processing proceeds to Step S20. If not so, the processing proceeds to Step S24.

At Step S20, the control unit 11 of the service server 1 generates an image ID and the digital watermark adding unit 15 synthesizes the generated image ID and the address of the service server 1 as the digital watermark with the image data read from the image file. At Step S22, next, the control unit 11 relates the image data having the digital watermark synthesized therewith to the image ID, thereby recording them in the image database (DB) of the image storage device 13.

At Step S24, the control unit 11 of the service server 1 decides whether the image ID is included in the order information received at the Step S16 or not. If the image ID is included, the processing proceeds to Step S26. If the image ID is not included, the processing proceeds to Step S40. The image ID is not included in the order information in the case of an original print order in which the received order information is neither a reorder nor an additional order. In the present embodiment, the original print order is an order for transmitting, to a new destination, a print product having new image data printed thereon, and it is necessary to transmit the image data and the destination information to the service server 1 in order to give the original print order.

At Step S26, the control unit 11 retrieves a history of the past print order including the image corresponding to the image ID through the print history database 17. At Step S28, the control unit 11 creates a list (which may include a new print product) of a print product including an image specified by the image ID, based on the past print history which is retrieved and extracted at Step S26, and then transmits the list of the print product to the terminal device 3 through the network IF 16. If a decision of Yes is made at Step S18 and a decision of Yes is subsequently made at Step S24, the control unit 11 creates a list of a destination for the print product including the image specified by the image ID, based on the past print history. The past print history is obtained by retrieving the print history database 17, based on the image ID included in the order information received at the Step S16. The control unit 11 transmits the list of the destination together with the list of the print product to the terminal device 3 through the network IF 16.

At Step S30, the terminal device 3 receives the print product list transmitted from the service server 1. At Step S32, the terminal device 3 creates a menu based on the print product list received at the Step S30 and displays the menu on the display unit 36. At Step S34, the terminal device 3 transmits, to the service server 1, an order ID (included in the print product list received at the Step S30) corresponding to a product selected from the displayed menu by the operation of the operating unit 37 of the orderer. In the case where the destination list is received together with the product list at the Step S30, the terminal device 3 creates the menu of the destination list together with the menu of the print product list and displays them on the display unit 36 at the Step S32. In the case where the orderer selects the destination from the menu of the destination list at the Step S34, the destination information thus selected is transmitted to the server 1 together with the order ID.

At Step S36, the control unit 11 of the service server 1 receives the order ID transmitted from the terminal device 3. At Step S38, the control unit 11 reads image data included in a product corresponding to the order ID from the image storage device 13, and furthermore, reads destination information (an addressee and a destination address) from the print history database. At the Step S40, there is created a print request including print data containing the image data read at the Step S38 and destination information. The print data include the image data read at the Step S38, template data and format data on the greeting card or the like which are stored in the memory 21, and the like. At Step S42, the control unit 11 transmits the print request including the print data to the print server 5. In the case where the destination information is received together with the order ID at the Step S36, the destination information received at the Step S36 is included in the print request at the Step S40.

At Step S44, the print server 5 receives the print request including the print data transmitted from the service server 1. At Step S46, the print server 5 prints image data in accordance with the format data in the print data. At Step S48, the print server 5 prints an addressee, a destination address or the like on an address side of a label (in the case of an album or the like) or a greeting card in preparation for the shipment of a print product. At Step S50, the print server 5 transmits, to the service server 1, a shipment completion notice indicating that the shipment is completed.

The service server 1 receives the shipment completion notice from the print server 5 at Step S52 and the service server 1 registers the print history (order history) including the service content in the print history database 17 at Step S54.

In the description of the flow chart of FIG. 12, if a decision of Yes is made at the Step S18 and a decision of Yes is subsequently made at the Step S24, a list of a destination of a print product including an image specified by an image ID is created based on a past print history. The past print history is obtained by a retrieval through the print history database 17 from the image ID included in the order information received at the Step S16. The list of a destination is transmitted together with the list of the print product to the terminal device 3 through the network IF 16. However, only the list of the destination may be transmitted to the terminal device 3 and the information about the destination selected by the terminal device 3 may be transmitted to the service server 1. In this case, for example, the image data received from the terminal device 3 at the Step S16 are printed as a photograph having a predetermined size and are transmitted to the destination selected from the list of the destination.

According to the present embodiment, in the service server (i.e. server device) 1, the digital watermark adding unit (i.e. information adding unit) 15 synthesizes, with image data on a print target, an image ID (first information) for specifying the image data and information (second information) about the address of the service server 1 as the digital watermark (i.e. invisible information) in such a format that the terminal device 3 can carry out reading. The print server 5 generates a print product (i.e. a printed object) from the print data including the image data with which the digital watermark is synthesized. The terminal device 3 reads the digital watermark from the print product to transmit the image ID (first information) to the service server 1 based on the second information. Consequently, by using the digital watermark as the invisible information, it is possible to embed, in the print product, the information about the image ID and the order acceptance server address such that the information is visually unrecognizable and do not disturb an appreciation of the print product.

The print history database 17 stores the print history indicative of the content of the print order. The image storage device 13 (i.e. the image storage unit) stores image data corresponding to an image ID. The menu generating unit 19 (i.e. the list generating unit) generates a list of a print product which uses the image data specified by the image ID, on the basis of the past print history of the image data specified by the image ID. The terminal device 3 transmits, to the service server 1, product specifying information for specifying the print product selected from the list of the print product. The service server 1 generates print data on the print product specified based on the product specifying information which is received and transmits the print data to the print server through the transmitting unit 11e. Consequently, on the basis of the image ID attached as a digital watermark to a single print product, it is possible to easily and simply give a print order for other print products in addition to an order for a reprint of the single print product.

The image storage device 13 stores the image data with which the digital watermark is synthesized through the digital watermark adding unit 15. For this reason, it is not necessary to synthesize the digital watermark with the image data at every print, which is easy and simple.

The person information database 18 stores personal information about an orderer of a print order and an addressee of a print product. The menu generating unit 19 (the list generating unit) acquires the personal information about the orderer or the addressee which corresponds to the past print history by referring to the person information database 18, and generates a list of a print product or a list of a destination based on the personal information and the past print history. Consequently, a print product which is suitable for an orderer of a print order and an addressee of the print product can be included in the list of the print product. Moreover, the personal information includes a birthday of the orderer or the addressee and the menu generating unit 19 generates the list of the print product based on the birthday of the orderer or the addressee. Therefore, the print product which is suitable for an age of the orderer or the addressee can be included in the list of the print product.

The digital watermark adding unit 15 adds a mark as graphic data to a part of image data to be a print target. The mark can be identified (recognized visually), by a person, as information indicating that the digital watermark is added to the image data. Consequently, the orderer or the addressee can find out the print product to which the digital watermark is added. In other words, the watermark adding unit (the information adding unit) 15 is a function unit for adding invisible information and visible information to the image data.

When the service server 1 receives other image data (i.e. second image data) together with the image ID, the menu generating unit 19 generates the list of the print product and the list of the destination by referring to the print history of the image data specified by the image ID, so as to allow a new order for the print of the second image data in place of a reorder for the print of the image data specified by the image ID. The digital watermark adding unit 15 synthesizes the second image ID for specifying the second image data and the information about the server address as the digital watermark with the second image data. The print data transmitting unit uses the second image data having the digital watermark synthesized therewith to generate print data on the print product selected from the list of the print product, thereby transmitting the print data, to the print server, together with the destination information selected from the list of the destination. Consequently, the orderer acquires only the image ID from the past print products in hand and displays, on the terminal device 3, the list of the print product which uses an image having the image ID and the list of the destination, so as to select the print product and the destination. Thus, it is possible to easily and simply give a new print order for a new image by utilizing the past order history. In other words, also in the case in which the orderer gives a print order for the new image, it is not necessary to input the details of the order through the terminal device 3 and notify the service server 1 of the details of the order.

<First Variant>

Although the image storage device 13 stores the image data subjected to the synthesis of the digital watermark in the embodiment, it may store image data with which the digital watermark has not been synthesized. In this case, the control unit 11 gives the image ID by storing the image ID (the first information) in the header portion of the image file including the image data and the header portion, so as to cause the image ID (the first information) to correspond to the image data (S20). Then, the image storage device 13 thus stores the image data which are caused to correspond to the image ID (the first information) (S22). The digital watermark adding unit 15 synthesizes, with the image data, the image ID and the address of the service server 1 as the digital watermark when the print data are to be created (S40).

<Second Variant>

In the embodiment, upon receipt of the shipment completion notice from the print server 5 (S52), the service server 1 registers the print history (the order history) in the print history database (S54). Upon receipt of the order ID from the terminal device 3 (S36), however, the service server 1 may register the print history (the order history) in the print history database.

<Third Variant>

In the embodiment, the image ID is used as the information (the first information) for specifying the image data and is embedded as the digital watermark in the image data. However, the first information for specifying the image data, that is, other information such as the order ID may be embedded as the digital watermark in the image data.

It is apparent that the present invention is not restricted to the embodiment and the variants but various changes can be made without departing from the scope of the technical thought.

The present application claims the priority based on Japanese Patent Application No. 2011-185867 filed on Aug. 29, 2011, and all of the contents of the application are incorporated in the specification by reference.

What is claimed is:

1. A server device for accepting a print order through a network, comprising:
    a communicating unit for communicating with a terminal device through the network;
    a print history database for storing a print history indicative of a content of the print order;
    an information adding unit for adding, to image data to be a print target, first information for specifying the image data and second information about an address of the server device as invisible information which can be read by the terminal device;
    a first print data transmitting unit for transmitting print data including the image data to which the invisible information is added, to a print server for generating a print product from the print data;
    an image storage unit for storing the image data which corresponds to the first information;
    a receiving unit for receiving the first information which the terminal device reading the invisible information from the print product transmits based on the second information;
    a list generating unit for generating a list of the print product using the image data specified by the first information, based on a past print history of the image data specified by the first information which is received;
    a list transmitting unit for transmitting the list of the print product through the communicating unit to the terminal device;
    a selected information receiving unit for receiving product specifying information that specifies the print product selected from the list of the print product by the terminal device, through the communicating unit from the terminal device; and
    a second print data transmitting unit for generating print data on the print product specified by the product specifying information, based on the image data to which the invisible information is added, thereby transmitting the print data to the print server.

2. The server device according to claim 1, wherein the image storage unit stores the image data to which the invisible information is added by the information adding unit.

3. The server device according to claim 1, further comprising:
    a person information database for storing personal information about an orderer of the print order and an addressee of the print product, wherein
    the list generating unit acquires personal information about an orderer or an addressee corresponding to the past print history by referring to the person information database and generates the list of the print product based on the personal information and the past print history.

4. The server device according to claim 3, wherein the personal information includes a birthday of the orderer or the addressee, and
    the list generating unit generates the list of the print product based on the birthday of the orderer or the addressee.

5. The server device according to claim 1, wherein the list generating unit generates a list of a destination of the print product using the image data specified by the first information, based on the past print history of the image data specified by the first information, in addition to the list of the print product,
    the list transmitting unit transmits the list of the destination to the terminal device in addition to the list of the print product,
    the selected information receiving unit receives, through the communicating unit, destination information selected from the list of the destination in the terminal device in addition to the product specifying information for specifying the print product selected from the list of the print product in the terminal device, and
    the second print data transmitting unit transmits, to the print server, the destination information received by the selected information receiving unit in addition to the generated print data.

6. The server device according to claim 1, wherein the information adding unit adds visible information indicating that the invisible information is added to a part of the image data to be the print target.

7. The server device according to claim 1, wherein when the receiving unit receives second image data together with the first information, the list generating unit generates, as a new order, the list of a print product using the image data specified by the first information, the information adding unit adds another first information for specifying the second image data and the second information related to the address of the server device as another invisible information to the second image data, and the second print data transmitting unit uses the second image data to which the invisible information is added, thereby generating the print data on the print product selected from the list of the print product and specified by the product specifying information, thereby transmitting the print data to the print server.

8. A system having a terminal device and a server device which communicate with each other through a network, the server device comprising:

a first communicating unit for communicating with the terminal device through the network;

a print history database for storing a print history indicative of a content of a print order;

an information adding unit for adding, to image data to be a print target, first information for specifying the image data and second information about an address of the server device as invisible information which can be read by the terminal device;

a first print data transmitting unit for transmitting print data including the image data to which the invisible information is added, to a print server for generating a print product from the print data;

an image storage unit for storing the image data which corresponds to the first information;

a receiving unit for receiving the first information which the terminal device reading the invisible information from the print product transmits based on the second information;

a list generating unit for generating a list of the print product using the image data specified by the first information, based on a past print history of the image data specified by the first information which is received;

a list transmitting unit for transmitting the list of the print product through the first communicating unit to the terminal device;

a selected information receiving unit for receiving product specifying information that specifies the print product selected from the list of the print product by the terminal device, through the first communicating unit from the terminal device; and a second print data transmitting unit for generating print data on the print product specified by the product specifying information, based on the image data to which the invisible information is added, thereby transmitting the print data to the print server, the terminal device comprising:

a photographing unit for photographing a subject;

a second communicating unit for communicating with the server device through the network;

a decoding unit for decoding invisible information of the first information for specifying the image data on the print product and the second information about the address of the server device, the invisible information being embedded in the print product photographed by the photographing unit;

an information transmitting unit for transmitting the first information obtained by decoding the invisible information to the address of the server device designated by the second information obtained by decoding the invisible information, through the second communicating unit;

a list receiving unit for receiving the list of the print product transmitted from the server device through the second communicating unit;

a product selecting unit for selecting the print product from the list of the print product; and a product specifying information transmitting unit for transmitting the product specifying information to the server device through the second communicating unit.

9. An order accepting method of accepting a print order through the network, in a server device including:

a communicating unit for communicating with a terminal device through a network; and a print history database for storing a print history indicative of a content of a print order, the method comprising:

adding, to image data to be a print target, first information for specifying the image data and second information about an address of the server device as invisible information which can be read by the terminal device;

transmitting print data including the image data to which the invisible information is added, to a print server for generating a print product from the print data;

storing the image data which corresponds to the first information;

receiving the first information which the terminal device reading the invisible information from the print product transmits based on the second information;

generating a list of the print product using the image data specified by the first information, based on a past print history of the image data specified by the first information which is received;

transmitting the list of the print product through the communicating unit to the terminal device;

receiving product specifying information that specifies a print product selected from the list of the print product by the terminal device, through the communicating unit from the terminal device; and generating print data on the print product specified by the product specifying information, based on the image data to which the invisible information is added, thereby transmitting the print data to the print server.

10. An order accepting method of accepting a print order through the network, in a system having a terminal device and a server device which communicate with each other through a network, the server device including: a first communicating unit for communicating with the terminal device through the network, and a print history database for storing a print history indicative of a content of a print order, and the terminal device including: a photographing unit for photographing a subject, and a second communicating unit for communicating with the server device through the network, the method comprising:

causing the server device to add, to image data to be a print target, first information for specifying the image data and second information about an address of the server device as invisible information which can be read by the terminal device;

causing the server device to transmit print data including the image data to which the invisible information is added to a print server for generating a print product from the print data;

causing the server device to store the image data which corresponds to the first information;

causing the terminal device to decode the invisible information of the first information for specifying the image data on the print product and the second information about the address of the server device, the invisible information being embedded in the print product photographed by the photographing unit;

causing the terminal device to transmit the first information obtained by decoding the invisible information to the address of the server device designated by the second information obtained by decoding the invisible information, through the second communicating unit;

causing the server device to receive the first information which the terminal device reading the invisible information from the print product transmits based on the second information;

causing the server device to generate a list of the print product using the image data specified by the first information, based on a past print history of the image data specified by the first information which is received;

causing the server device to transmit the list of the print product through the first communicating unit to the terminal device;

causing the terminal device to receive the list of the print product transmitted from the server device through the second communicating unit;

causing the terminal device to select the print product from the list of the print product, thereby transmitting product specifying information for specifying the print product to the server device through the second communicating unit;

causing the server device to receive the product specifying information from the terminal device through the first communicating unit; and causing the server device to generate print data on a print product specified by the product specifying information, based on the image data to which the invisible information is added, thereby transmitting the print data to the print server.

* * * * *